(12) United States Patent
Tanaka et al.

(10) Patent No.: US 7,484,277 B2
(45) Date of Patent: Feb. 3, 2009

(54) NONWOVEN FABRIC FOR ARTIFICIAL LEATHER AND PROCESS FOR PRODUCING ARTIFICIAL LEATHER SUBSTRATE

(75) Inventors: Daisuke Tanaka, Okayama (JP); Yasuhiro Yoshida, Okayama (JP); Hisao Yoneda, Okayama (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 0 days.

(21) Appl. No.: 11/576,912

(22) PCT Filed: Oct. 6, 2005

(86) PCT No.: PCT/JP2005/018514

§ 371 (c)(1),
(2), (4) Date: Oct. 30, 2007

(87) PCT Pub. No.: WO2006/040992

PCT Pub. Date: Apr. 20, 2006

(65) Prior Publication Data

US 2008/0163469 A1  Jul. 10, 2008

(30) Foreign Application Priority Data

Oct. 8, 2004  (JP)  ............... 2004-296394

(51) Int. Cl.
*D04H 5/02* (2006.01)
*D04H 3/10* (2006.01)
*D06N 3/00* (2006.01)

(52) U.S. Cl. .......................... 28/107; 28/112

(58) Field of Classification Search .......... 28/107, 28/112, 108–111, 113–115, 163, 165, 162; 26/29 R; 156/148, 250, 253, 269, 324; 264/103
See application file for complete search history.

(56) References Cited

U.S. PATENT DOCUMENTS 3,731,352 A * 5/1973 Okamoto et al. ............... 28/112
3,877,120 A * 4/1975 Okamoto et al. ............... 28/115
4,145,468 A * 3/1979 Mizoguchi et al. .......... 442/269
4,342,802 A  8/1982 Pickens, Jr. et al.
4,426,421 A * 1/1984 Nakamae et al. ............. 442/271

(Continued)

FOREIGN PATENT DOCUMENTS

JP  62-078281  4/1987

(Continued)

*Primary Examiner*—Amy B Vanatta
(74) *Attorney, Agent, or Firm*—Oblon, Spivak, McClelland, Maier & Neustadt, P.C.

(57) ABSTRACT

To provide a method of producing a nonwoven fabric for artificial leather and substrate for artificial leather which is capable of providing the substrate for artificial leather having a sufficient shape stability by producing the nonwoven fabric for artificial leather without causing serious damages to the scrim.

A method of producing a nonwoven fabric for artificial leather, including a step of entanglement for uniting superposed fiber web and scrim by a needle punching, wherein the needle punching is performed in a manner satisfying the following formulae 1 and 2:

$$S_1 < 2P \leq S_1/\cos(D_1 \times (\pi/180)) \quad (1)$$

$$S_2 < 2P \leq S_2/\cos(D_2 \times (\pi/180)) \quad (2)$$

wherein $S_1$ is a diameter of warps constituting the scrim, $S_2$ is a diameter of wefts constituting the scrim, $D_1$ is an angle between the warps and barbs which penetrate the scrim, $D_2$ is an angle between the wefts and barbs which penetrate the scrim, and P is a total barb depth of the barbs.

7 Claims, 1 Drawing Sheet

1: Needle
2: Barb
3: Warp of scrim
4: Weft of scrim
$S_1$: Diameter of warp constituting scrim
$S_2$: Diameter of weft constituting scrim
$D_1$: Angle between barb penetrating scrim and warp
$D_2$: Angle between barb penetrating scrim and weft

U.S. PATENT DOCUMENTS

| | | | |
|---|---|---|---|
| 4,476,186 A * | 10/1984 | Kato et al. | 442/60 |
| 4,587,142 A * | 5/1986 | Higuchi et al. | 428/15 |
| 4,612,688 A * | 9/1986 | Gerlach et al. | 28/104 |
| 4,833,012 A * | 5/1989 | Makimura et al. | 442/329 |
| 5,112,421 A * | 5/1992 | Honda et al. | 156/148 |
| 7,025,915 B2 * | 4/2006 | Wang et al. | 264/103 |

FOREIGN PATENT DOCUMENTS

| | | |
|---|---|---|
| JP | 3-082858 | 4/1991 |
| JP | 2000-336581 | 12/2000 |
| WO | WO 2005/024121 A2 | 3/2005 |

\* cited by examiner

1: Needle

2: Barb

3: Warp of scrim

4: Weft of scrim $S_1$: Diameter of warp constituting scrim $S_2$: Diameter of weft constituting scrim $D_1$: Angle between barb penetrating scrim and warp $D_2$: Angle between barb penetrating scrim and weft

NONWOVEN FABRIC FOR ARTIFICIAL LEATHER AND PROCESS FOR PRODUCING ARTIFICIAL LEATHER SUBSTRATE

TECHNICAL FIELD

The present invention relates to a process of producing nonwoven fabrics for artificial leather and substrates for artificial leather, in which the shape stability of the resultant substrates for artificial leather is enhanced by producing the nonwoven fabric for artificial leather from a fiber web and a scrim without damaging the scrim significantly.

BACKGROUND ART

Artificial leathers are generally composed of the combination of a nonwoven fabric and an elastic polymer and combine an appearance, flexibility and softness comparable to those of natural leathers and mechanical properties superior to those of natural leathers. Known artificial leathers are excellent in the flexibility and softness, but fail to simultaneously satisfy a high shape stability which is required, for example, in upholsteries for seats. Therefore, various methods for reinforcing the structure of nonwoven fabric with a scrim have been proposed when particularly high shape stability is needed.

The methods for reinforcing nonwoven fabrics with a scrim are roughly classified to two types: a method of uniting a scrim on one surface of a nonwoven fabric or between two nonwoven fabrics by a adhesive and a method of uniting a scrim on one surface of a nonwoven fabric or between two nonwoven fabrics by a fiber entanglement. In the former method, a scrim having desired properties is simply adhesively bonded to the back surface of, for example, a general artificial leather mentioned above. Therefore, this method can be easily performed without difficulty only by controlling the elongation of two sheet materials during the adhesion operation. The same may be said of adhesively uniting a scrim between two artificial leathers. In the latter method, a non woven fabric and a scrim, which are quite different in their fibrous structures, are united by the entanglement in the thickness direction caused by mechanically treating the fibers of the nonwoven fabric. However, this method involves several problems, because the method inevitably causes the undesirable change and damage in the structures of nonwoven fabric and scrim and the damage of fibers when the nonwoven fabric and the scrim are strongly entangled. In case of uniting a scrim with a short fiber or long fiber nonwoven fabric which is made of superfine fiber-forming fibers such as sea-island fibers and core-sheath fibers or direct-spun superfine fibers, the entanglement is generally effected by a jet flow or needle punch from the side of the nonwoven fabric of a stack which includes two sheets of nonwoven fabric and a scrim interposed between the nonwoven fabrics or a stack which includes one sheet of nonwoven fabric and a scrim superposed on one surface of the nonwoven fabric. To solve the above problems in the mechanical entanglement, there is proposed a method in which a stack of a web and a knitted or woven fabric is needle-punched using needles having a total barb depth which is half or less of the diameter of the yarns constituting the knitted or woven fabric (for example, Patent Document 1). However, the entangling efficiency of the fibers constituting the web is insufficient because the total barb depth is relatively small. To enhance the entanglement, the number of punch should be increased. However, this causes the increased damage of the knitted or woven fabric. In particular, the damage of the knitted or woven fabric becomes significant when the yarns constituting the knitted or woven fabric have a relatively small number of twists and are easily caught on barbs even when its total barb depth is small. If the number of twists is increased to solve this problem, the yarns becomes difficult to be caught on barbs and the damage of knitted or woven fabric is decreased because the highly twisted yarns are difficult to break even when caught on barbs. However, the highly twisted yarns make the feel of the knitted or woven fabric hard, this resulting in a hard feel of the resultant artificial leather. In another proposal, a fibrous sheet made of short fibers having a fiber length of 10 mm or less and a knitted or woven fabric is united by a jet flow (for example, Patent Document 2). As compared with the entanglement by needle punching, the jet flow can entangle fibers with little damage of fibers. However, since the fiber length is very short, the short fibers are likely to pull out from the united body whatever strongly entangled. Therefore, it is difficult to attain a high surface abrasion resistance without impairing the feel and appearance. In the application requiring a shape stability, which is one of the main objects of the present invention, including interior materials such as upholsteries for seats, a high surface abrasion resistance is required in addition to a feel with flexibility, softness and bulkiness. However, the production method for producing a substrate for artificial leather which sufficiently combines such properties is hitherto not proposed.

Patent Document 1: JP 7-13344B
Patent Document 2: JP 60-29775B

DISCLOSURE OF THE INVENTION

Problems to be Solved by the Invention

An object of the present invention is to provide a method of producing a nonwoven fabric for artificial leather by uniting a fiber web and a scrim in a manner of ensuring a high tenacity, a high shape stability and a good appearance without impairing a flexibility, softness and bulkiness. Another object is to provide a method of producing a substrate for artificial leather from such a nonwoven fabric.

Means for Solving the Problems

As a result of extensive research in view of the above objects, the inventors have found that the objects are achieved by needle-punching a stack of a fiber web and a scrim having a particular structure using specific needles under controlled conditions. The present invention is based on this finding.

The present invention relates to:

(1) a method of producing a nonwoven fabric for artificial leather, including a step of entanglement for uniting superposed fiber web and scrim by a needle punching, wherein the needle punching is performed in a manner satisfying the following formulae 1 and 2:

$$S_1 < 2P \leq S_1/\cos(D_1 \times (\pi/180)) \tag{1}$$

$$S_2 < 2P \leq S_2/\cos(D_2 \times (\pi/180)) \tag{2}$$

wherein $S_1$ is a diameter of warps constituting the scrim, $S_2$ is a diameter of wefts constituting the scrim, $D_1$ is an angle between the warps and barbs which penetrate the scrim, $D_2$ is an angle between the wefts and barbs which penetrate the scrim, and P is a total barb depth of the barbs;

(2) the method described in (1), wherein a number of twists is 0 to 1000 T/m for each of the warps and wefts;

(3) the method described (1) or (2), wherein the fiber web contains fibers capable of forming superfine fibers with a fineness of 0.5 dtex or less;

(4) the method described in any one of (1) to (3), wherein the scrim contains fibers capable of forming superfine fibers with a fineness of 0.5 dtex or less;

(5) a method of producing a substrate for artificial leather, which includes a step of impregnating an elastic polymer to the nonwoven fabric as described in any one of (1) to (4);

(6) a method of producing a substrate for artificial leather, which includes a step of impregnating an elastic polymer to the nonwoven fabric as described in (3) or (4) before or after converting the fibers capable of forming superfine fibers to superfine fibers; and (7) a method of producing a suede artificial leather, which includes a step of napping at least one surface of the substrate for artificial leather produced in (6).

Effect of the Invention

According to the method of the present invention, a nonwoven fabric for artificial leather composed of a scrim and a nonwoven fabric that are strongly united by entanglement is produced with little damage of scrim due to needle punching. The nonwoven fabric for artificial leather and the substrate for artificial leather produced from the nonwoven fabric by impregnating an elastic polymer exhibit a high shape stability due to the reinforcing scrim. By finishing the surface of the substrate for artificial leather in a known manner, for example, forming a surface coating layer or napping the surface, an artificial leather having not only a high tenacity and shape stability but also a high quality appearance and a flexible, soft and bulky feel is produced.

BEST MODE FOR CARRYING OUT THE INVENTION

The fiber for constituting the fiber web and the yarn for constituting the scrim are not particularly limited in view of obtaining the main effect of the present invention in the production of a nonwoven fabric for artificial leather by strongly uniting the fiber web and the scrim without causing a fatal damage to both. In view of commercial values, i.e., a high quality in the appearance and feel of the nonwoven fabric for artificial leather, the substrate for artificial leather produced from the nonwoven fabric and the artificial leather produced by processing the substrate, it is preferred that the fiber web and scrim contain superfine fiber-forming fibers in an amount sufficient for obtaining the desired commercial value.

The superfine fiber-forming fiber is preferably produced by a composite melt spinning or mixed melt spinning of two or more kinds of thermoplastic polymers which are less compatible to one another. One example for such fiber is a sea-island fiber which can be converted to various kinds of fibers according to the combination of the thermoplastic polymers for the sea component and island component. For example, by dissolving the sea component to a solvent or aqueous solution or decomposing the sea component by a decomposer such as sodium hydroxide, the sea component is removed from the sea-island fiber and the remaining island component is fibrillated to a bundle of superfine fibers. Another example is a splittable fiber in which different kinds of thermoplastic polymers are arranged alternately in layers. Various arrangements which are geometrically acceptable have been proposed. For example, the thermoplastic polymers are arranged so as to form parallel interfaces or radial interfaces optionally with concentric interfaces on the cross section of the splittable fiber. The splittable fiber is fibrillated to a bundle of superfine fibers of each polymer by mechanically splitting along the interfaces or decomposing one polymer component to a predetermined extent by a decomposer. The splittable fiber is easy to mechanically fibrillate along the interfaces, and therefore, likely to cause fiber damage due to the unfavorable splitting during the entangling operation by needle punching and the formation into the fiber web and scrim. Since the different kinds of fibers have different dyeability, a suede-finished, elegant napping is difficult to obtain. In addition the superfine fibers generated from the splittable fibers are easy to firmly adhere by an elastic polymer, to make the feel hard. With such drawbacks of the splittable fiber, the fiber web is preferably formed from the sea-island fibers.

The polymer for the island component of the sea-island fiber is selected from melt-spinnable polymers exhibiting sufficient fiber properties such as tenacity. Preferred are polymers having, as compared with a polymer for the sea component, a large melt viscosity and a large surface tension under the spinning conditions. Examples thereof include polyamide such as nylon 6 and nylon 66, copolymers mainly composed of polyamide, polyester such as polyethylene terephthalate, polytrimethylene terephthalate and polybutylene terephthalate, and copolymers mainly composed of polyester.

The polymer for the sea component is preferably selected from polymers having a melt viscosity lower than that of the island polymer, having a solubility and decomposability different from those of the island component, having a large solubility and decomposability to solvent and decomposer which are used for removing the sea component and having a little compatibility with the island component. Examples thereof include polyethylene, modified polyethylene, polypropylene, polystyrene, modified polyester and modified polyvinyl alcohol.

The volume ratio of the sea component and the island component (sea component/island component) is preferably 25/75 to 75/25. If the sea component is less than 25%, the amount to be removed by dissolution to a solvent or decomposition by a decomposer is too small. Therefore, the feel of the resultant substrate for artificial leather is insufficient in the flexibility and softness. In addition, the sea component and the island component are separated during the needle punching for the production of the nonwoven fabric for artificial leather, to further deteriorate the feel. If the sea component exceeds 75%, the amount of fibers made of the island component after the removal of the sea component by dissolution and decomposition is deficient. Therefore, the resultant substrate for artificial leather fails to have the mechanical properties required in the intended application. In addition, a large amount of the sea component should be removed by dissolution and decomposition. This is environmentally undesirable and industrially disadvantageous in view of costs and productivity.

In the present invention, the superfine fiber-forming fibers convertible into superfine fibers of 0.5 dtex or less are preferably used. The average fineness of the island component after removing the sea component by dissolution is preferably 0.5 dtex or less, and more preferably 0.1 dtex or less. If exceeding 0.5 dtex, the flexibility and softness of the substrate are poor to result in a rough touch and feel. When being 0.1 dtex or less, in particular, a suede artificial leather having an appearance covered with high-quality, fine napped fibers can be obtained. The average fineness of the superfine fibers is preferably 0.0001 dtex or more. If being 0.0001 dtex or more, the resultant suede artificial leather acquires a strength, abrasion resistance and color developability with required levels. In addition the superfine fiber-forming fibers convertible to superfine fibers having such an average fineness are relatively stably spun, and the superfine fiber-forming fibers can be successfully converted into bundles of superfine fibers. The superfine fiber-forming fibers thus produced are made into filaments through stretching, crimping, heat setting, etc. in known manners, and then, directly made into a long-fiber (filament) web by a known spun bonding method or melt blow method. Alternatively, the filaments are cut into staples which are then made into a short-fiber (staple) web through a carding machine, a webber for making random webs and crosslap webs, etc. Two or more webs thus produced are, if necessary, superposed to regulate the mass per unit area and texture within desired levels, to obtain the fiber web. Generally, the webs of the same kind are superposed, i.e., the webs of short fibers (staples) are mutually superposed or the webs of long fibers (filaments) are mutually superposed. However, if necessary, the webs of different kinds may be superposed. The length of the staples is preferably 15 to 100 mm and more preferably 20 to 80 mm in view of the entanglement between the staples in the fiber web by needle punching, the entanglement between the staples in the fiber web and the fibers in the scrim, and the bulkiness of the resultant nonwoven fabric for artificial leather. The fibers for the fiber web may be mainly composed of long fibers (filaments). In this case, since the entanglement between the long fibers (filaments) in the fiber web is not required to be so strong as compared with the entanglement between the staples, the needle punching conditions are preferably selected so as to attain the intended entanglement between the fiber web and the scrim and bulkiness of the nonwoven fabric for artificial leather.

If necessary, the staples or long fibers (filaments) of the fiber web are preferably provided with a known oil agent. Preferred examples include known oil agents which can regulate the fiber-to-fiber friction or fiber-to-metal friction such as polyorganosiloxane, modified silicone oil, mineral oil, and antistatic agent. The oil agent or oil agents may be provided at once or in several portions according to the properties of fibers and polymers constituting the fiber surface. The oil agents may be used in the form of blend. The oil agent is provided at any stage of the production such as before crimping, after crimping, upon mixing fibers, upon forming the fiber web, and upon needle punching. The same oil agent or different oil agents may be provided in several stages. The superfine fiber-forming fibers preferably used in the present invention are likely to cause troubles of winding and fiber split at the steps of mechanically treating the fibers such as the carding step and needle punching step. Therefore, it is preferred to lubricate the fibers predominantly by the above oil agent to decrease the friction coefficient.

The kind of scrim, i.e. the weave structure of the scrim is not particularly limited and may be in a known weave structure such as a plain weave, a twill weave, a satin weave, and their derivative weaves. The nonwoven fabric for artificial leather of the present invention is composed of the fiber web and scrim which are united with each other by the entanglement attained by allowing the fibers of the fiber web to penetrate into the weave structure of the scrim. Therefore, the weave structure into which the fibers of the fiber web are difficult to easily penetrate should be avoided as far as possible.

The tenacity, shape stability and resistance to damages due to barbs increase with increasing number of twists of the yarns constituting the scrim. However, the feel of the resultant substrate for artificial leather is unfavorably made hard. Therefore, the number of twists of the yarns constituting the scrim is preferably 0 to 1000 T/m, more preferably 100 to 700 T/m and still more preferably 200 to 600 T/m.

Examples of the yarns for constituting the scrim include, but not limited to, known yarns such as filament yarns, spun yarns, innovation spun yarns, and blended or composite yarns of filament yarns and spun yarns.

The yarn for forming the scrim may be made of any kind of fiber as long as the yarns made thereof can be knitted or woven. Examples thereof include synthetic fibers such as polyester, polyamide and polyaramide; natural fibers such as cotton, silk and wool; regenerated fibers such as rayon; and semi synthetic fibers such as acetate. In view of the quality of appearance and uniform feel of the resultant substrate for artificial leather, it is preferred that the yarns contain the superfine fiber-forming fibers, particularly, the superfine fiber-forming fibers which are the same or similar to those for forming the fiber web. The superfine fiber-forming fibers for constituting the yarns for the scrim is preferably selected from those which can be converted into the superfine fibers with a fineness of 0.5 dtex or less. The average fineness of the island component after removing the sea component by dissolution is preferably 0.5 dtex or less. The fineness is more preferably 0.1 dtex or less because the fineness is close to that of the fibers which constitute the fiber web to be superposed. Therefore, a uniform feel resembling that of natural leathers is obtained and the appearance is not made strange even if the yarns of the scrim are exposed to the surface by the entangling treatment.

The average fineness of the superfine fibers is preferably 0.0001 dtex or more. If being 0.0001 dtex or more, the resultant artificial leather acquires a strength, abrasion resistance and color developability with required levels. In addition, the superfine fiber-forming fibers convertible to superfine fibers having such an average fineness are relatively stably spun and the superfine fiber-forming fibers can be successfully converted into bundles of superfine fibers.

The single fiber fineness of the superfine fiber-forming fibers suitable for the scrim is preferably 1 to 5 dtex and is preferably in the form of filament (long fiber) in view of making fibers. Thus, multi-filament yarns are preferably used as the yarns for constituting the scrim. The diameter of the multi-filament yarns may be suitably selected according to the number of filaments, and generally 30 to 300 dtex. To enhance the entanglement between the fiber web and the scrim, the diameter is preferably 40 to 150 dtex and more preferably 50 to 100 dtex.

The mass per unit area of the scrim is suitably selected according to the final use, and preferably 20 to 200 g/m² and most preferably 40 to 100 g/m² even after converting the superfine fiber-forming fibers into the superfine fibers. If less than 20 g/m², the fibrous structure of the scrim is very loose and poor in the shape stability to cause slippages of yarns. If exceeding 200 g/m², the fibrous structure of the scrim is excessively dense to prevent the needles from sufficiently penetrating it. Therefore, the entanglement of the fiber web and a high entanglement between the fiber web and the scrim are not attained to make the production of a united sheet structure difficult.

The fiber web and the scrim mentioned above are superposed with each other and then needle-punched, to produce the nonwoven fabric for artificial leather by uniting the fiber web and the scrim by entanglement without serious damages of the structure and yarns of the scrim. Of the barbs provided in the blade portion of needle, the barb to penetrate the scrim should have a total barb depth (P) satisfying the following formulae:

$$S_1 < 2P \leq S_1/\cos(D_1 \times (\pi/180)) \qquad (1), \text{ and}$$

$$S_2 < 2P \leq S_2/\cos(D_2 \times (\pi/180)) \qquad (2).$$

If $S_1 \geqq 2P$ and $S_2 \geqq 2P$, the fiber web and the scrim are not sufficiently entangled to reduce the efficiency of entanglement. An insufficient entanglement may cause wrinkling after the needle punching or in subsequent steps. If $2P>S_1/\cos(D_1 \times (\pi/180))$ and $2P>S_2/\cos(D_2 \times (\pi/180))$, the warps and wefts of the scrim are seriously damaged during the needle punching, failing to achieve the effect of the present invention.

The penetration of the scrim referred to herein means that the top of barbs reaches at least a depth corresponding to the half of the thickness of the stack of warps or wefts constituting the scrim. The total barb depth (P) is the total of the throat depth and the kick-up of needles before use, i.e., the distance between the top of barb and the deepest portion of barb which is measured along the perpendicular line dropped from the top of barb to the center line of the blade. The total barb depth (P) is expressed by the average of the measured values of about 50 needles which are randomly selected. $S_1$ and $S_2$ are not the values calculated from the finenesses of yarns and fibers constituting the yarns, production conditions and processing conditions, but the diameters ($S_1$ for the warps and $S_2$ for the wefts) of the yarns mainly constituting the scrim which are measured by the observation of the scrim surface under a scanning electron microscope. Each of $S_1$ and $S_2$ is expressed by the arithmetic average of the maximum value, the minimum value and other 10 values randomly selected in the observing field of 1 to 5 mm square. Some fibers constituting multifilament yarns and spun yarns are partially outwardly apart from the bundles of fibers at a distance corresponding to one or two fibers. These fibers apart from the bundles of fibers are not considered in the measurement of diameter. $D_1$ and $D_2$ are the angles between the barb penetrating the scrim and the yarns ($D_1$ for the angle with the warps and $D_2$ for the angle with the wefts). Specifically, each of $D_1$ and $D_2$ is the angle between the normal line to the center line of yarns and the perpendicular line dropped from the top of barb to the center line of the blade, which is measured in the range of 0 to 90°.

The total barb depth (P) should be selected while taking the entangling ability of the fiber web itself by needle punching into consideration in addition to the above formulae. Although depending upon the ratio between the throat depth and the kick-up, the total barb depth (P) is preferably 50 to 150 μm and more preferably 70 to 120 μm. If exceeding 150 μm, the smoothness and evenness of the nonwoven fabric for artificial leather are deteriorated. In addition, the penetrated needles leave large and noticeable pores which, in turn, impair the appearance and surface characteristics of the resultant substrate for artificial leather. If less than 50 μm, the fibers constituting the fiber web become difficult to be caught by the barbs, failing to improve the entanglement of the fiber web itself and the entanglement between the fiber web and the scrim. These problems may occur for some ratios of the throat depth and the kick-up. The throat depth and the kick-up can be suitably selected so that the total thereof falls within the above range for the total barb depth. When the kick-up is far larger than the throat depth, the entanglement is strikingly improved, but, the pores formed by the penetrated needles become remarkably large. Therefore, needles of zero kick-up, i.e., no kick-up needles are preferably used in the production of the nonwoven fabric for suede artificial leathers.

The number of barbs is not specifically limited as long as the above requirements are satisfied, and suitably selected in consideration of the entangling ability of the fiber web itself, the entangling ability between the fiber web and the scrim and the appearance, evenness and bulkiness of the resultant nonwoven fabric for artificial leather. The needles penetrating the scrim should satisfy the above formulae, and single barb needles are preferably used to minimize the pores formed by penetrated needles and to ensure a good appearance of the nonwoven fabric for artificial leather together with a sufficient entanglement of the fiber web itself. To reduce the damages of the yarns constituting the scrim while enhancing the entanglement, it is preferred to prevent the barbs as much as possible from penetrating the scrim perpendicularly to the yarns constituting the scrim. Thus, each of $D_1$ and $D_2$ is preferably 35 to 55° and more preferably 40 to 50°. With such angles, the barbs less catch the yarns during the penetration through the scrim and are nearly directed to the intersecting or entangling points of the warps and wefts, to reduce the damages of the scrim.

If the fiber web is made of the superfine fiber-forming fibers, the fineness thereof before being converted into superfine fiber is preferably 10 dtex or less and more preferably 1 to 6 dtex. If being 10 dtex or less, the surface of the nonwoven fabric for artificial leather after the needle punching and the resultant substrate for artificial leather is sufficiently smooth. If less than 1 dtex, the damages of the fibers due to the needle punching cannot be avoided, to make the production of the nonwoven fabric for artificial leather which is uniformly and successfully entangled difficult.

The diameter of each of the warps and wefts constituting the scrim is preferably 120 to 250 μm in view of the strength and feel of the substrate for artificial leather, and more preferably 150 to 220 μm for allowing the total barb depth in the range mentioned above to satisfy the above formulae.

The fiber web may be needle-punched before being stacked with the scrim. The punching density, i.e., the number of needles per unit area for punching the superposed fiber web and scrim is preferably 2000 punch/cm² or less and more preferably 1500 punch/cm² or less. The punching density exceeding 2000 punch/cm² is not preferred, because the scrim is heavily damaged even if the needle punching is performed according to the present invention, failing to provide the substrate for artificial leather with a sufficient shape stability. When the fiber web is preliminarily entangled by the needle punching before being stacked with scrim, the punching density is preferably 1000 punch/cm² or less, more preferably 700 punch/cm² or less, and most preferably 300 to 600 punch/cm². If the punching density for the pre-entanglement exceeds 1000 punch/cm², the fiber web is excessively entangled. Therefore, in the subsequent needle punching of the superposed fiber web and scrim, the fibers in the fiber web little enter into the scrim for entanglement, failing to obtain the fiber web and scrim which are strongly united by entanglement.

The non woven fabric for artificial leather thus obtained may be, if necessary, pressed in the thickness direction under heating or cooling to improve the surface smoothness and control the thickness and apparent density. The press may be carried out by a known method such as a method in which the nonwoven fabric for artificial leather is allowed to pass through the gap between heating rolls and a method in which a pre-heated nonwoven fabric for artificial leather is allowed to pass through the gap between cooled rolls. By such pressing, the sea component in the sea-island fibers, i.e., the low melt viscosity component such as polyethylene, melts and allow the neighboring fibers to be press-bonded to one another, to achieve the above objects. Before pressing, a fixing agent which can be removed in the subsequent steps or a small amount of a fixing agent which is not removable, such as polyvinyl alcohol, starch and resin emulsion, may be added to the nonwoven fabric for artificial leather so as to prevent the change in the shape due to the tension in the length direction and width direction or a pressure in the thickness direction.

Next, a solution or dispersion of a elastic polymer is impregnated to or coated on the nonwoven fabric for artificial leather and then the elastic polymer is allowed to solidify into a spongy or dot form, to obtain the substrate for artificial leather of the present invention. When the nonwoven fabric for artificial leather is made of fibers or yarns which are capable of converting into superfine fibers or bundles of superfine fibers, the conversion of the fibers or yarns may be conducted before or after the provision of the elastic polymer. With such an elastic polymer impregnated in a controlled amount, the feel and mechanical properties of the artificial leather is controlled in a desired level, the pulling out of the fibers such as superfine fibers from the substrate for artificial leather is prevented, and the adhesion of the surface coating layer is enhanced.

The elastic polymers usable in the present invention are those conventionally used in the production of artificial leathers. Preferred examples thereof include polyurethane resins, polyvinyl chloride resins, polyacrylic acid resins, polyamino acid resins, silicone resins, copolymers of the preceding resins, and mixtures thereof, with polyurethane resins being particularly preferred because the resultant substrate for artificial leather is well balanced in the sensor quality such as natural leather-like feel and touch and the physical quality such as mechanical properties and durability. These resins are impregnated into the nonwoven fabric for artificial leather in the form of an aqueous dispersion or a solution in a organic solvent, and then, coagulated by a heating coagulation, dry coagulation wet coagulation, etc. The amount of the elastic polymer to be provided is preferably 1 to 150% by mass based on the nonwoven fabric for artificial leather. If exceeding 150%, although the mechanical properties and the adhesion of the surface coating layer are improved, the feel of the resultant artificial leather becomes rubbery, failing to satisfy the users who want a high quality on the artificial leathers. If less than 1%, the effect of providing the elastic polymer is substantially not obtained. When the nonwoven fabric for artificial leather is made of the fibers or yarns which are to be converted into superfine fibers, etc., the above amount of the elastic polymer is based on the mass of the nonwoven fabric for artificial leather after such conversion.

When the fibers or yarns constituting the nonwoven fabric for artificial leather are the superfine fiber-forming fibers, the fibers or yarns are converted into superfine fibers before or after providing the elastic polymer. The conversion is effected by treating the nonwoven fabric for artificial leather with a treating liquid which is a solvent to the sea component but a non or poor solvent to the elastic polymer or which is a decomposer to the sea component but a non or weak decomposer to the elastic polymer. Thus, the substrate for artificial leather composed of the nonwoven fabric for artificial leather made of the converted fibers or yarns and the elastic polymer is obtained.

The thickness of the substrate for artificial leather is suitably selected according to the final use of the artificial leather, and therefore, not particularly limited. Generally the thickness is 0.3 to 3 mm and preferably 0.5 to 2.5 mm in view of the balance between the feel and properties of the artificial leather and the easiness of production.

The suede artificial leather is produced by napping at least one surface of the substrate for artificial leather to form a napped fiber surface. The napped fiber surface is formed by a known treatment for regulating the thickness such as a buffing of the substrate with a sand paper and a slicing of the substrate using a hand knife. Alternatively, the napped fiber surface is formed by buffing at least one surface of the substrate with a sand paper after treating its surface with a treating liquid such as a solvent, solution of elastic polymer silicone solution and emulsion or before the treatment for regulating the thickness or the surface treatment.

Then, the suede artificial leather is dyed by a known method. Preferred are acid dyes and gold-containing complex dyes for polyamide fibers and disperse dyes for polyester fibers. In addition, sulfur dyes and vat dyes which change water-insoluble are preferred for polyamide fibers because the washing fastness is excellent. The artificial leather is dyed in a deep color with increasing concentration of a dyeing solution. However, the excess dye easily comes out in the wash to reduce the dye fastness. Therefore, the concentration of the dyeing solution is preferably about 3% or less based on the mass of the fibers. If necessary, the wet surface of the artificial leather immediately after dyeing may be brushed because the dye fastness is enhanced in many cases by such brushing. By forming a grain surface on at least one surface of the substrate for artificial leather by a known method, a grain artificial leather is obtained.

The present invention is described in more detail with reference to examples. However, it should be noted that the scope of the invention is not limited to the following examples.

The properties were measured by the following methods.

Average Single (Fiber) Fineness

The cross-sectional area of the fibers constituting the sheet was measured by a scanning electron microscope (magnification: several hundreds to several thousands). The average single (fiber) fineness was calculated from the measured area and the density of the resin forming the fibers.

Breaking Strength

Measured according to the method A of JIS L1096 8.12.1.

Entanglement Between Fiber Web and Scrim

Evaluated by the interlaminar peeling strength.

Interlaminar Peeling Strength

A sample was prepared by cutting 23 cm in the longitudinal direction (length direction of sheet) and 2.5 cm in the width direction. The longitudinal end surface of the sample was cut by a razor along the center line with respect to the thickness direction. Then, the end surface was peeled off in about 10 cm by hands. The peeled portions were held in chucks and the sample was peeled off by a tensile testing machine at a tensile speed of 100 m/min. The average peeling strength was determined from the flat portion of the obtained stress-strain curve (SS curve). The results were shown by the average of three samples.

Feel of Product

The evaluation was made by 10 testers who were engaged in the production and distribution of artificial leathers. The feeling when grasped the artificial leather was evaluated by the following rating. The result was expressed by the most dominant rating.

Ratings for Flexibility and Softness
A: moderate dense feel, flexibility and softness
B: insufficient flexibility and softness
C: no flexibility and softness Wrinkles in Product The surface of the artificial leather was observed by 10 testers who were engaged in the production and distribution of artificial leathers, to determine whether the surface was wrinkled.

EXAMPLE 1

The following staples of sea-island composite fibers were used:
island component: polyethylene terephthalate,
sea component: polystyrene,
area ratio on fiber cross section: island component/sea component=65/35, number of island component: 16, fineness: 4.4 dtex, and fiber length: about 50 mm.

The staples were carded and superposed by a crosslapper to obtain a web. The web was then needle-punched at a density of 560 punch/cm² to obtain a fiber web having a mass per unit area of 223 g/m².

Between two fiber webs, was interposed a plain weave scrim made of yarns of a fineness of 54 dtex, 24 filaments, a twist number of 500 T/m, $S_1$ of 170 □m and $S_2$ of 170 □m. The superposed fiber webs and scrim were needle-punched from the upper and back surfaces at a punching density of 690 punch/cm² (total 1380 punch/cm²) using a needle board. On the needle board, single barb needles having a total barb depth P of 100 □m were implanted, which were arranged so that the needles penetrating the scrim formed angles of $D_1$=45° and $D_2$=45° with the warps and wefts of the scrim. The mass per unit area of the obtained nonwoven fabric for artificial leather was 510 g/m². A 14% DMF solution of a polycarbonate polyurethane was impregnated to the nonwoven fabric and the polycarbonate polyurethane was wet-coagulated in an aqueous solution of DMF. After washing with water, the sea component (polyethylene) was removed by the extraction with toluene of 85° C., to obtain a substrate for artificial leather made of superfine fibers having a single fiber fineness of 0.1 dtex. One surface of the substrate for artificial leather was buffed with a #180 sand paper to reduce the thickness to 0.8 mm. Then, the opposite surface was coated with a mixed solvent of 20 parts of DMF and 80 parts of acetone in an amount of 8 g/m² using a 200 mesh gravure roll and dried. The gravure-coated surface was successively buffed twice with a #240 sand paper and twice with a #600 sand paper, to obtain non-dyed suede artificial leather.

The non-dyed suede artificial leather was scalded in a hot water of 90° C. for 10 min to relax the fabric and then dyed in a dyeing bath of 700 L at 130° C. for 60 min using a circular dyeing machine. The dyeing bath contained dyes: 1.57% owf of Palanil ECO Turquoise, 1.42% owf of Teratop Pink 3G and 2.00% owf of Sumikaron UL Yellow GF, 2.0 g/L of a level dyeing agent; KP Leveler AUL (derivative of aromatic sulfonate manufactured by Nippon Kayaku Co., Ltd.), 1.8 g/L of a pH modifier (New Buffer K manufactured by Mitejima Chemical Co., Ltd.) and 250 g/L of a metal ion deactivator (Neocrystal).

After adding 7 g/L of thiourea dioxide and 5 g/L of sodium hydroxide, the reduction treatment was carried out at 65° C. for 30 min. Then, the oxidation treatment was carried out twice at 70° C. for 20 min. The first oxidation treatment was conducted in an aqueous solution containing 3 g/L of hydrogen peroxide and 6 g/L of soda ash, and the second oxidation treatment was carried out in an aqueous solution containing 6 g/L of hydrogen peroxide and 6 g/L of soda ash. After neutralizing with a 1 g/L aqueous solution of acetic acid, the dyed product was washed with water to complete the dyeing. After drying, the treatments for making flexible and ordering raised naps were conducted.

As shown in Table 1, the breaking strength of the obtained nonwoven fabric for artificial leather was 14 kg/2.5 cm in the length direction and 10 kg/2.5 cm in the width direction. The fiber web and scrim were firmly united and the reinforcing effect of the scrim was sufficient even after made into a substrate for artificial leather. The obtained substrate for artificial leather favorably combined a sufficient strength with a soft feel.

EXAMPLE 2

A nonwoven fabric for artificial leather and substrate for artificial leather were produced in the same manner as in Example 1 except for using the following staples of sea-island composite fibers:

island component: polyethylene terephthalate, sea component: polystyrene, area ratio on fiber cross section: island component/sea component=75/25, number of island component: 50 fineness: 4.6 dtex, and fiber length: about 50 mm.

As shown in Table 1, the breaking strength of the obtained nonwoven fabric for artificial leather was 16 kg/2.5 cm in the length direction and 12 kg/2.5 cm in the width direction. The fiber web made of superfine fibers with a single fiber fineness of 0.02 dtex and scrim were firmly united and the reinforcing effect of the scrim was sufficient even after made into a substrate for artificial leather. The obtained substrate for artificial leather favorably combined a sufficient strength with a soft feel.

EXAMPLE 3

A nonwoven fabric for artificial leather, substrate for artificial leather and suede artificial leather were produced in the same manner as in Example except for using a plain weave scrim made of yarns ($S_1$ and $S_2$ were both 170 □m) with a number of twists of 500 T/m which was constituted by the same fibers as used in the fiber web. The obtained substrate for artificial leather and suede artificial leather combined a sufficient strength with an extremely soft feel. The properties are shown in Table 1.

EXAMPLE 4

A nonwoven fabric for artificial leather, substrate for artificial leather and suede artificial leather were produced in the same manner as in Example 1 except for using single barb needles having a total barb depth P of 110 □m. The obtained substrate for artificial leather and suede artificial leather combined a sufficient strength with an extremely soft feel. The properties are show in Table 1.

EXAMPLE 5

A nonwoven fabric for artificial leather, substrate for artificial leather and suede artificial leather were produced in the same manner as in Example 1 except for using single barb needles having a total barb depth P of 90 □m. The obtained substrate for artificial leather and suede artificial leather combined a sufficient strength with an extremely soft feel. The properties are shown in Table 1.

Comparative Example 1

A nonwoven fabric for artificial leather and substrate for artificial leather were produced in the same manner as in Example 1 except for changing $D_1$ to 30° and $D_2$ to 60°.

As shown in Table 2, the breaking strength of the obtained nonwoven fabric for artificial leather was 22 kg/2.5 cm in the length direction and 5.5 kg/2.5 cm in the width direction. The weft yarns were significantly damaged by the penetrating barbs. In the nonwoven fabric for artificial leather, the fiber web and scrim were firmly united. However, the reinforcing effect of the scrim was insufficient when made into a substrate for artificial leather. On the surface of the obtained suede artificial leather, fine longitudinal wrinkles were scattered.

Comparative Example 2

A nonwoven fabric for artificial leather and substrate for artificial leather were produced in the same manner as in Example 1 except for using single barb needles having a total barb depth P of 60 μm.

As shown in Table 2, the breaking strength of the obtained nonwoven fabric for artificial leather was 14 kg/2.5 cm in the length direction and 11 kg/2.5 cm in the width direction. Like Example 1, the scrim was not significantly damaged. However, the interlaminar peel strength between the scrim and fiber web was extremely low to show that the fiber web and scrim were not sufficiently united by the entanglement. The surface of the obtained suede artificial leather had striking fine longitudinal wrinkles.

Comparative Example 3

A nonwoven fabric for artificial leather having a mass per unit area of 512 g/m² and a substrate for artificial leather were produced in the same manner as in Example 1 except for using a plain weave scrim made of yarns $S_1$ and $S_2$ were both 128 μm) of 84 dtex/72 filaments having a number of twists of 2500 T/m and single barb needles having a total barb depth P of 60 μm and changing D1 to 30° and D2 to 60°.

As shown in Table 2, the breaking strength of the obtained nonwoven fabric for artificial leather was 20 kg/2.5 cm in the length direction and 16 kg/2.5 cm in the width direction. Substantially no damage was found in the scrim and the fiber web and scrim were firmly united. However, the obtained substrate for artificial leather had a hard feel. In addition, the surface of the obtained suede artificial leather had striking fine longitudinal wrinkles.

Comparative Example 4

A nonwoven fabric for artificial leather and substrate for artificial leather were produced in the same manner as in Comparative Example 3 except for using single barb needles having a total barb depth P of 80 μm.

The obtained substrate for artificial leather has a hard feel. In addition the surface of the obtained suede artificial leather had striking fine longitudinal wrinkles. The properties are shown in Table 2.

INDUSTRIAL APPLICABILITY

The nonwoven fabric for artificial leather and substrate for artificial leather produced by the method of the present invention have a high tenacity and a low elongation. Using the nonwoven fabric for artificial leather and substrate for artificial leather, artificial leathers which combine a good shape stability with a softness and high quality are produced. The artificial leathers are suitable for the production of interior materials, clothes, shoes, bags and hand gloves.

TABLE 1

|  | Examples | | | | |
|---|---|---|---|---|---|
|  | 1 | 2 | 3 | 4 | 5 |
| Scrim |  |  |  |  |  |
| fineness (dtex/f) | 54/24 | 54/24 | 54/24 | 54/24 | 54/24 |
| number of twists (T/m) | 500 | 500 | 500 | 500 | 500 |
| mass per unit area (g/m²) | 55 | 55 | 55 | 55 | 55 |
| $S_1$ (μm) | 170 | 170 | 170 | 170 | 170 |
| $S_2$ (μm) | 170 | 170 | 170 | 170 | 170 |
| Needle Punching |  |  |  |  |  |
| P (μm) | 100 | 100 | 100 | 110 | 90 |
| $D_1$ (°) | 45 | 45 | 45 | 45 | 45 |
| $D_2$ (°) | 45 | 45 | 45 | 45 | 45 |
| $P > S_1/2$ | A* | A | A | A | A |
| $P > S_2/2$ | A | A | A | A | A |
| $P \leq S_1/2\cos(D_1 \times \pi/180)$ | A | A | A | A | A |
| $P \leq S_2/2\cos(D_1 \times \pi/180)$ | A | A | A | A | A |
| Breaking strength |  |  |  |  |  |
| length direction (kg/2.5 cm) | 14 | 16 | 9 | 14 | 15 |
| transverse direction (kg/2.5 cm) | 10 | 12 | 6 | 11 | 10 |
| Entanglement between fiber web and scrim interlaminar peel strength (kg/2.5 cm) | 2.0 | 2.2 | 1.9 | 2.2 | 2.0 |
| Feel of products | A | A | A | A | A |
| Surface wrinkles | none | none | none | none | none |

A*: satisfied.

TABLE 2

|  | Comparative Examples | | | |
|---|---|---|---|---|
|  | 1 | 2 | 3 | 4 |
| Scrim |  |  |  |  |
| fineness (dtex/f) | 54/24 | 54/24 | 84/72 | 84/72 |
| number of twists (T/m) | 500 | 500 | 2500 | 2500 |
| mass per unit area (g/m²) | 55 | 55 | 70 | 70 |
| $S_1$ (μm) | 170 | 170 | 128 | 128 |
| $S_2$ (μm) | 170 | 170 | 128 | 128 |
| Needle Punching |  |  |  |  |
| P (μm) | 100 | 60 | 60 | 80 |
| $D_1$ (°) | 30 | 45 | 30 | 30 |
| $D_2$ (°) | 60 | 45 | 60 | 60 |
| $P > S_1/2$ | A* | B* | B | A |
| $P > S_2/2$ | A | B | B | A |
| $P \leq S_1/2\cos(D_1 \times \pi/180)$ | B | A | A | A |
| $P \leq S_2/2\cos(D_1 \times \pi/180)$ | A | A | A | B |
| Breaking strength |  |  |  |  |
| length direction (kg/2.5 cm) | 22 | 14 | 20 | 16 |
| transverse direction (kg/2.5 cm) | 5.5 | 11 | 16 | 12 |
| Entanglement between fiber web and scrim interlaminar peel strength (kg/2.5 cm) | 1.8 | 1.2 | 1.2 | 2.5 |
| Feel of products | A | A | C | C |
| Surface wrinkles | B | C | C | C |

A*: satisfied.
B*: not satisfied.

BRIEF DESCRIPTION OF DRAWINGS

FIGURE is a schematic illustration for explaining the relationship between the scrim and needle employed in the present invention.

REFERENCE NUMERALS

Figure 1:
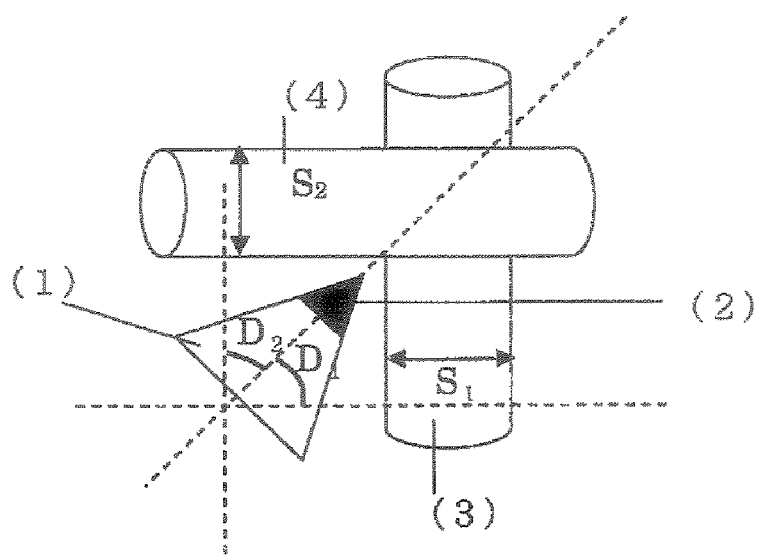

1: Needle
2: Barb
3: Warp of scrim
4: Weft of scrim
$S_1$: Diameter of warp constituting scrim
$S_2$: Diameter of weft constituting scrim
$D_1$: Angle between barb penetrating scrim and warp
$D_2$: Angle between barb penetrating scrim and weft

What is claimed is:

1. A method of producing a nonwoven fabric for artificial leather, comprising a step of entanglement for uniting superposed fiber web and scrim by a needle punching, wherein the needle punching is performed in a manner satisfying the following formulae 1 and 2:

$$S1 < 2P \leq S_1/\cos(D_1 \times (\pi/180)) \quad (1)$$

$$S2 < 2P \leq S_2/\cos(D_2 \times (\pi/180)) \quad (2)$$

wherein $S_1$ is a diameter of warps constituting the scrim, $S_2$ is a diameter of wefts constituting the scrim, $D_1$ is an angle between the warps and barbs which penetrate the scrim, $D_2$ is an angle between the wefts and barbs which penetrate the scrim, and P is a total barb depth of the barbs.

2. The method according to claim 1, wherein a number of twists is 0 to 1000 T/m for each of the warps and wefts.

3. The method according to claim 1, wherein the fiber web contains fibers capable of forming superfine fibers with a fineness of 0.5 dtex or less.

4. The method according to claim 1, wherein the scrim contains fibers capable of forming superfine fibers with a fineness of 0.5 dtex or less.

5. A method of producing a substrate for artificial leather, which comprises the method of claim 1 and further comprising a step of impregnating an elastic polymer to the nonwoven fabric.

6. A method of producing a substrate for artificial leather, which comprises the method of claim 3 and further comprising a step of impregnating an elastic polymer to the nonwoven fabric before or after converting the fibers capable of forming superfine fibers to superfine fibers.

7. A method of producing a suede artificial leather, which comprises the method of claim 6 and further comprising a step of napping at least one surface of the substrate for artificial leather.

* * * * *